United States Patent [19]

Meyer et al.

[11] Patent Number: 4,643,421
[45] Date of Patent: Feb. 17, 1987

[54] VIDEO GAME IN WHICH A HOST IMAGE REPELS RAVENOUS IMAGES BY SERVING FILLED VESSELS

[75] Inventors: Steven M. Meyer, Chicago; R. Scott Morrison, Vernon Hills; Howard J. Morrison, Deerfield, all of Ill.

[73] Assignee: Marvin Glass & Associates, Chicago, Ill.

[21] Appl. No.: 646,685

[22] Filed: Aug. 31, 1984

[51] Int. Cl.$^4$ .................................................. A63F 9/22
[52] U.S. Cl. .................................. 273/1 E; 273/1 GC; 273/DIG. 28
[58] Field of Search ................... 273/1 E, 1 GC, 85 G, 273/237, DIG. 28, 313; 434/307, 323; 340/720, 724–727

[56] References Cited

U.S. PATENT DOCUMENTS

| 4,035,841 | 7/1977 | Micek | 273/DIG. 28 |
| 4,093,221 | 6/1978 | Dash | 273/DIG. 28 |
| 4,508,353 | 4/1985 | Meyer et al. | 273/1 GC |
| 4,517,558 | 5/1985 | Davids | 273/143 R |

FOREIGN PATENT DOCUMENTS

2116345  9/1983  United Kingdom ............ 273/143 R

Primary Examiner—Richard C. Pinkham
Assistant Examiner—MaryAnn Stoll Lastova
Attorney, Agent, or Firm—John S. Pacocha

[57] ABSTRACT

A video game in which the player must fill mugs from a keg and slide the filled mugs down a bar to advancing thirsty patrons to repel the patron out the bar. The player controls movement of a host image from one horizontal bar to another and laterally along a bar plus the filling of mugs. If any of the thirsty patrons reach the keg end of the bar the player loses a turn. Repelled patrons are delayed while drinking and then return the empty mugs. Unless the empty mugs are caught by the host the player loses a turn. A turn is also lost if the player serves a full mug and there is no thirsty patron awaiting it. From time to time a tip will appear on one of the bars which the host image may pick up causing dancers to appear for an interlude during which some of the patrons turn to watch. While watching the patrons neither advance nor are thirsty. Bonus entertainment racks are periodically introduced during which six cans are displayed. Five of the cans are shaken and the cans then exchange positions after which the player must select the one unshaken can to obtain bonus points.

19 Claims, 12 Drawing Figures

Fig 10 BAR PATTERNS

WESTERN A
WESTERN B
WESTERN C
SPORTS
PUNK A
PUNK B
SPACE A
SPACE B
SPACE C

Fig 9 PATRON PATTERNS

| RACK | BAR PATTERN | PATRON PATTERN | SPEED |
|---|---|---|---|
| 1 | WESTERN A | A | 1 |
| 2 | WESTERN B | B | 1 |
| BONUS | | | |
| 3 | SPORTS | C | 1 |
| 4 | SPORTS | D | 1 |
| 5 | SPORTS | E | 1 |
| BONUS | | | |
| 6 | PUNK A | D | 1 |
| 7 | PUNK B | E | 2 |
| 8 | PUNK A | F | 3 |
| 9 | PUNK B | G | 4 |
| BONUS | | | |
| 10 | SPACE A | G | 5 |
| 11 | SPACE B | G | 6 |
| 12 | SPACE C | G | 7 |
| 13 | SPACE D | G | 8 |
| BONUS | | | |
| 14 | WESTERN C | G | 9 |
| 15 | WESTERN C | G | 9 |
| BONUS | | | |
| 16 | SPORTS | G | 9 |
| 17 | SPORTS | G | 9 |
| 18 | SPORTS | G | 9 |
| BONUS | | | |
| 19 | PUNK B | G | 9 |
| 20 | PUNK A | G | 9 |
| 21 | PUNK B | G | 9 |
| 22 | PUNK A | G | 9 |
| BONUS | | | |
| 23 | SPACE A | G | 9 |
| 24 | SPACE B | G | 9 |
| 25 | SPACE C | G | 9 |
| 26 | SPACE D | G | 9 |
| BONUS | | | | ically electronic video games of the
VIDEO GAME IN WHICH A HOST IMAGE REPELS RAVENOUS IMAGES BY SERVING FILLED VESSELS

BACKGROUND OF THE INVENTION

1. Field Of The Invention

This invention relates generally to games and, more particularly to electronic video games of the type where a player controllable image moves and directs projectiles at advancing opposition.

2. Background Art

Games, particularly electronic video games of the type playable in arcades, or on home television sets by means of adapters, have become popular. Various types of current games, including maze chase, sports simulation, electronic variations of classic entertainment pursuits and other media such as poker, blackjack and chess, as well as target shooting games based on different themes are available. In the popular prior art Bally Midway SPACE INVADERS video game generally horizontal lines or waves of alien images move from side to side and advance down, line by line, toward a defending image which can shift from side to side and fire up at the alien images to destroy them. The SPACE INVADERS aliens fire their own projectiles at the defender and there is a spaceship moving across the screen above the lines of aliens which the player tries to shoot in between the aliens to score bonus points. However, there remains a need for games that challenge players to control movement of a defending or host image and repel advancing opposition by means of player controllable projectiles in a nonviolent entertaining manner that is neither fatal to the player controllable image or the opposition.

SUMMARY OF THE INVENTION

The present invention is concerned with providing a video game in which the player must fill mugs from a keg and slide the filled mugs down a bar to advancing thirsty patrons in order to repel the patron out of the bar. A player controlled host image moves along the bar and from bar to bar. In response to the player's operation of a tapper control, the host image moves to the keg end of the bar, if not already there, and fills a mug. In each scene or rack there are a number of bars with a door end and a keg end. A number of thirsty patrons advance from the door end to the keg end demanding drinks. The bars are generally horizontal. If any of the patrons reach the keg end of the bar the player loses a turn. A patron is repelled back an incremental distance toward the door end of the bar upon being served a full mug. When the patron is repelled to the door end boundary, the patron is ousted but reenters the bar after a predetermined delay. If not ousted, the patron's advance is delayed while the patron consumes the contents of the mug. When the mug is empty, the patron returns the empty mug back down the bar toward the keg. The player controlled host image must be moved to intercept and catch the empty mug before it falls off the keg end of the bar and breaks. Should an empty mug fall and break the player loses a turn. If a filled mug is slid down the bar and there is no thirsty patron awaiting it, the filled mug goes out the door end of the bar and the player loses a turn. From time to time a tip will appear on one of the bars which the host image may move and pick up in response to player controls. If the host image picks up the tip, dancers appear on the stage for a brief interlude during which some of the patrons turn to watch. The watching patrons neither advance nor may receive a filled mug. Bonus entertainment racks are periodically introduced during which six cans are displayed. After a character shakes five of the cans, the cans exchange positions and the player must select the one can that was not shaken to obtain bonus points.

BRIEF DESCRIPTION OF THE DRAWINGS

For a better understanding of the present invention reference may be had to the accompanying drawings in which.

DETAILED DESCRIPTION OF THE PREFERRED EMBODIMENT

Figure 1:
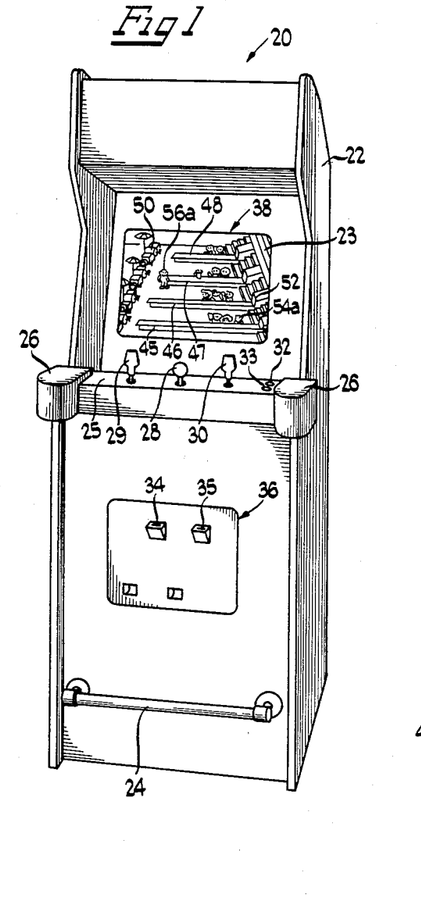
FIG. 1 is a perspective view of an embodiment of the present invention housed in a cabinet and showing a display that may occur during play.

Referring now to the drawings in which like parts are designated by like reference characters throughout the several views, there is shown in FIG. 1 a video arcade game 20 embodying the present invention. The arcade game is housed in a generally upright cabinet 22 in which are contained the necessary electronic components including a central processing unit, memory, video display, and sound processing equipment for the game. The video display of the game is shown on a screen 23 in the upper portion of the cabinet 22. Secured to the front of the cabinet 22, near but spaced, from the bottom, is a foot rail 24. Below, and in front of, the display screen 23 there is a control panel 25. At each side end of the control panel there is a drink holder 26. Generally centrally disposed on the control panel is a joystick 28. On either side of the joystick there is a player left tapper control 29 and a player right tapper control 30. In addition, there are buttons 32 and 33 mounted on the panel for selecting "one" or "two" participant play of the game. Initial activation of the video arcade game 20 is controlled by the deposit of a coin through the slots 34 and 35 in the coin box mechanism 36 contained in the lower front portion of the cabinet 22.

Figure 2:
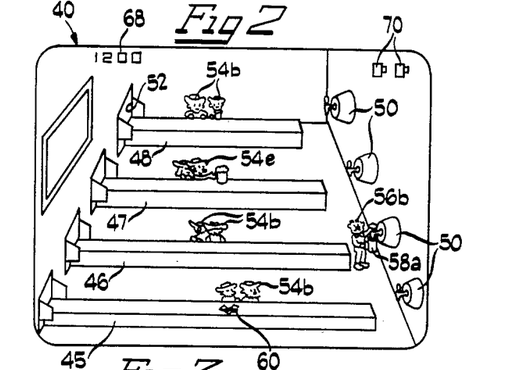
FIG. 2 is an illustration of a display that may occur during another rack of play from that shown in FIG. 1.
Figure 3:
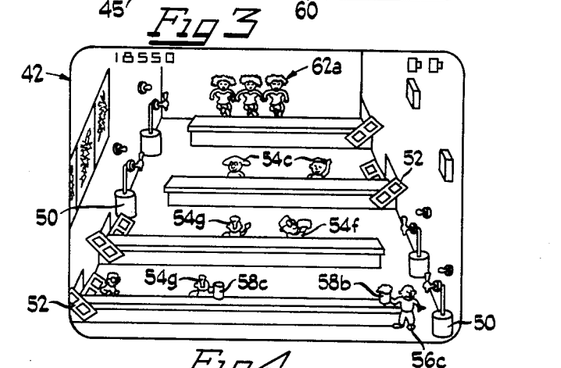
FIG. 3 is an illustration of a display that may occur during yet another rack of play.
Figure 4:
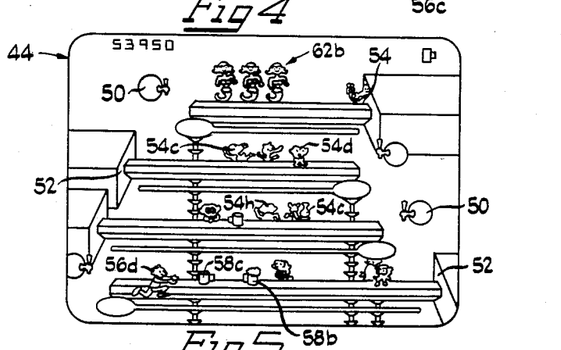
FIG. 4 is an illustration of a display that may occur in still another rack of play.

By using the joystick control 28 and the tapper controls 29 or 30 on the control panel 26 a player is able to interact with the electronic video game of the present invention to play and enjoy a number of different racks or scenes embodying the game. As shown on the display screen 23 in FIG. 1 and each of FIGS. 2, 3, and 4 the game includes racks using different, though related, scenes depicting a sports 38, western 40, punk 42, and space 44 setting playing field, respectively. In each of the regular racks, there are, as shown in FIGS. 1-4, four, generally parallel, horizontal bars 45, 46, 47, and 48. At one end of each of the bars 45-48 there is a supply image, or keg 50. Remote from the keg 50 is a boundary represented by the door image 52 at the opposite end of each bar. All of the bars 45-48 shown in FIG. 1 are oriented in one direction, while all of those in FIG. 2 are oriented in the opposite direction. In other racks, the keg and door ends of some of the bars are in the one direction and the others are reversed as illustrated in the displays of FIGS. 3 and 4.

Every rack starts with at least one ravenous or thirsty patron introduced at the boundary represented by the door image 52 of each bar. Patrons in the sports scene are depicted as athletes 54a, those in the western scene 40 are cowboys or cowgirls 54b. Punk patrons 54c are in scene 42 of FIG. 3 while space creatures 54d crowd the futuristic bars of scene 44. The thirsty patrons appear in the screen at the door end of each bar and advance in predetermined increments along the bar toward the keg end. As play progresses during the rack, additional thirsty patrons are introduced at the door end of each bar until there may be as many as four patrons at each bar for a total of sixteen patrons. In later racks, more thirsty patrons initially appear, as indicated in the Patron Patterns diagram of FIG. 9. Thus, in the more advanced racks all sixteen thirsty patrons initially appear at the beginning of the rack. As the patrons advance along a bar toward the keg 50 they are animated by conventional, sequential depiction of poses, to clamor for a drink.

A host or bartender image, which is responsive to the player controls 28, 29, and 30 appears in each of the racks. Joystick control 28 moves the host from left to right along a bar between the door and keg ends of the bar and will also shift the player from one bar to the other by the up or down movement of the joystick. Conveniently, the same host image is used in each of the western, sports, punk, and space settings. If desired, however, a separate host image apropos to each of the settings may be used. The host image is depicted in four basic action sequences. Initially, as depicted in FIG. 1, the host image 56a stands wiping the bar at the supply or keg 50 end.

Tapper controls 29 and 30 are normally biased to the upright, "off", position shown in FIG. 1. When a player pulls either of the tappers down toward the player the switch is turned on and the host image 56 moves to the keg 50 at the end the bar on which the host image is positioned and begins filling a mug or vessel 58a. As is conventional with many of prior art video games parts of the displayed scene may be changed every one-thirtieth of a second. Conveniently, the preferred embodiment is set so that the player must hold down one of the tapper controls for about a half of a second to completely fill a mug 58b. Sequential pictures of a filling mug such as mug 58a appear with the host image 56b during the less than one second interval. If the player holds down the tapper for a greater amount of time the mug merely appears to continue to fill. However, if the player releases the tapper control after the mug is filled, the filled mug 58b will be propelled or slid toward the door end of the bar by the host image 56c.

Upon an advancing patron such as the cowboy 54e in FIG. 2 receiving a filled mug 58b, the receiving patron will be moved or repelled back toward the door end of the bar a predetermined incremental distance. If the patron is moved to the boundary at the door image 52, the patron goes off screen for a predetermined time interval and then reenters the same bar at the door 52. However, if the repelled thirsty patron remains on screen, the patron will then be shown in a drinking pose 54f as in FIG. 3. When the patron, after a predetermined delay, finishes drinking the beverage, the empty mug 58c, is slid back toward the supply or keg end of the bar.

If an empty mug 58c reaches the supply end of the bar and the host is present in any of the wiping, filling or serving poses 56a, b and c, respectively, the empty mug will be caught. The player also has the option of moving the host laterally along the bar to intercept the empty mug as in FIG. 4 where the host image is displayed in a running action pose 56d. When the player successfully positions the host image to catch an empty mug 58c the player earns One Hundred points. However, if any empty mug 58c, in the absence of an interception, should reach the end of the bar and the host image is not there to catch it, the empty mug will be depicted as falling off the bar and breaking (not shown) and the player will lose a life or turn.

From time to time, on any one of the bars 45-48, a patron will leave a tip 60. The tip will remain on the bar for a period of time during which the player may, through use of the joystick control 28, cause the host image to, in the same running action sequence as is used to run and catch an empty mug, run over and pick up the tip. Upon the host picking up the tip, the player scores Fifteen Hundred points and a dancing chorus line apropos to the setting such as the chorus line 62a in the punk scene 42, or the chorus line 62b in the space scene 44 appears above the uppermost bar 48. The chorus line stays on the screen for a predetermined time interval during which randomly selected thirsty patrons such as 54g and 54h, shown in FIGS. 3 and 4, respectively, turn around to watch the dancing. While a patron is turned around watching the dancing, such a patron is not thirsty and will not receive a filled mug 58b. Similarly a patron such as the drinking patron 54f has no need of a filled mug. Thus, if the player propels a filled mug 58b along a bar on which there are no thirsty patrons 54, or a bar on which there are only drinking patrons 54f and/or chorus line watching patrons 54g or 54h, the propelled filled mug will go all the way along the bar and off the screen appearing to go out the door 52. Should such a filled mug go out the door, the player will lose a turn. A player will also lose a turn or life if the player permits any thirsty patron to reach the supply or keg end of one of the bars.

In order to successfully complete a rack and advance to the next rack the player must, through operation of the joystick control 28 and one of the tapper controls 29 or 30, serve all of the thirsty patrons, but not the drinking patrons or the chorus line watching patrons with a filled mug 58b to repel the thirsty patrons back toward, and eventually out, the door 52. Whenever a thirsty patron is served a filled mug and repelled out of the door, the ousted patron reenters after a predetermined time delay. For every thirsty patron that the player serves a filled mug the player accumulates points according to the scene as follows:

| | |
|---|---|
| Western racks | 50 points; |
| Sports racks | 75 points; |
| Punk racks | 100 points; and |
| Space racks | 150 points. |

Figure 5:
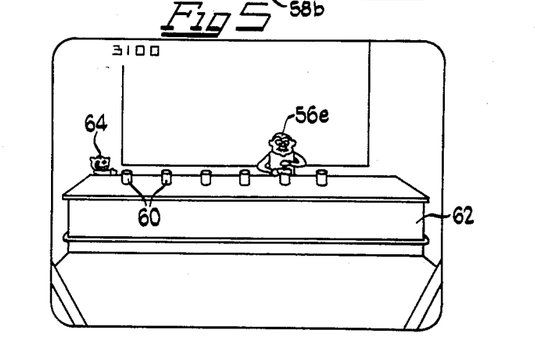
FIG. 5 is an illustration of a display that may occur during the bonus rack.
Figure 8:
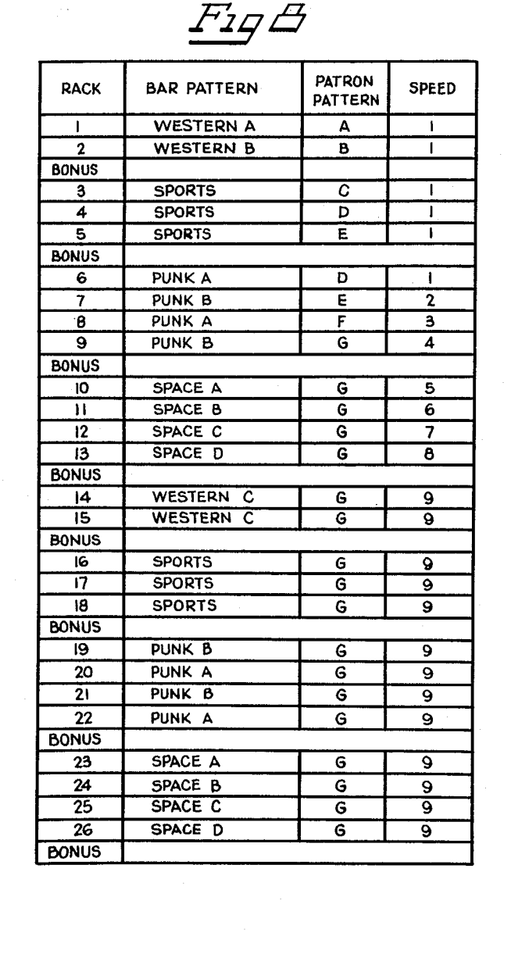
FIG. 8 is a table showing the bar pattern, patron pattern and speed for each of racks one through twenty-six.

Between each sequence of the regular racks, as indicated in the FIG. 8 Table there is a bonus rack which is illustrated in FIG. 5. In each bonus rack there are six beverage cans 60 displayed atop a single bar 62. A game controlled stealthy image 64 appears on the screen and shakes all but a randomly selected one of the cans 60. All of the cans 60 are then moved so that each can exchanges places with another in a "shell game" type manner attempting to confuse the player as to the location of the one unshaken can. The player then has a fixed time interval in which to select the unshaken can by use of the joystick 28 to move the host image 56e laterally until the host is positioned behind the player selected can. Once a player has selected a can, the player operates one of the tapper controls to see if the proper can has been selected. If the player selects the one unshaken can appropriate audio and/or video reward indications (not shown) are displayed on the screen in a manner that is conventional in prior art video games and the player scores Fifteen Hundred points. Should the player be fooled and fail to select the unshaken can, a consequence image (not shown) of the can spraying the host image 56e is displayed.

During the course of play the player's score 68 may be displayed in the upper left hand portion of the screen and the remaining turns or lives are indicated by a mug or mugs 70 appearing in the upper right hand portion of the screen.

Figure 6:
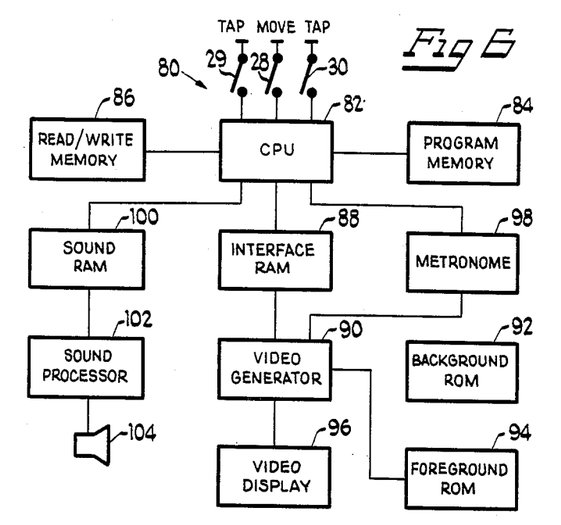
FIG. 6 is a block diagram illustrating the electronic components of the embodiment.

FIG. 6 shows an exemplary electronic apparatus 80 for implementing the present invention that includes a microprocessor unit 82 connected to the player operated controls. The "left", "right", "up", and "down" switches of the joystick 28 are represented in the block diagram by a single switch. Each of the tapper controls 29 and 30 is also shown as a switch. All three of the switches interact with central processing unit or CPU 82. In addition, the CPU 82 is connected to a nonvolatile program memory 84, a read/write memory 86, an interface RAM 88, and a sound RAM 100. The basic game and image programs are stored in memory 84. Read/write memory 86 stores current information for a particular game apparatus 20 such as high score, number of coins deposited and the like. Memory 86 also stores current game information that is erased at the start of every game such as game score, plus information that is current for each rack such as the time delay before an ousted patron image reappears.

The interface RAM 88 includes the input/output binary information for implementing the various graphics including the patron images 54a-h, as well as the host images 56a-e and mug images 58a-c. RAM 88 is connected to a video generator 90 which also receives input from a background picture ROM 92 and a foreground picture ROM 94. Included in the generator 90 is a field comparator that properly integrates the background and foreground scenes. The video generator 90 drives a conventional video display 96. A metronome 98 also driven by the video generator 90 is connected to the CPU 82 so that the CPU is synchronized with the video generator 90.

A sound RAM 100 is connected to the CPU 82 and to a sound processor 102 for driving the speaker 104 to produce audio effects that further the play of the game. While a variety of well known devices can be used as the apparatus 80, one adaptable apparatus is that used in the video arcade game DISCS OF TRON and described in the Midway Mfg. Co. Operator's Manual for that game.

Figure 7:
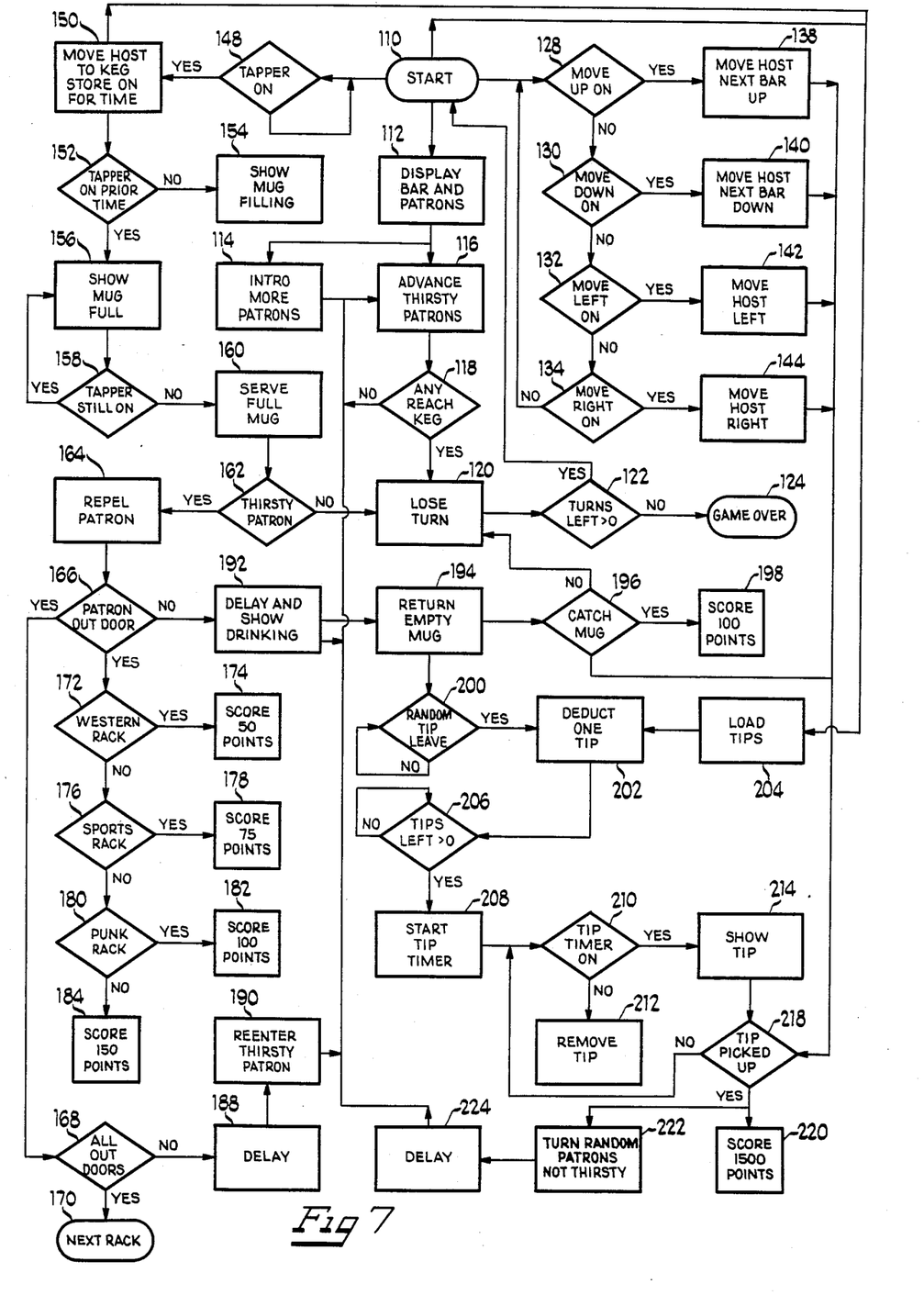
FIG. 7 is a flow chart of part of the operation of the embodiment.
Figure 10:
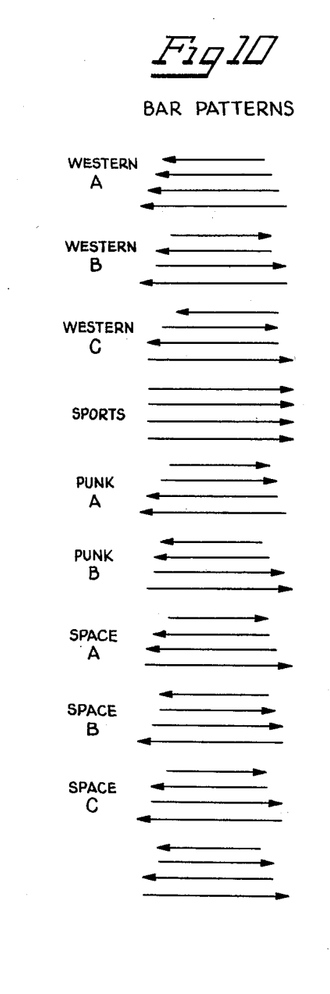
FIG. 10 is a schematic showing of various bar patterns.

Referring now to the flow chart of FIG. 7, after deposit of proper coinage in the slots provided in the coin box mechanism 36 and selection of the correspondingly proper one or two player participation by depression of the applicable button 32 or 33 the game begins with the start of the rack as represented by 110. The first rack, as indicated in the FIG. 8 Table, is a western rack in which all of the bars are oriented in one direction as illustrated in FIG. 2 which is the Bar Pattern designated as "WESTERN A" in the Table and schematically diagrammed in FIG. 10. The Table of FIG. 8 also indicates the Patron Pattern for the first rack as "A" which, as schematically indicated in FIG. 10, introduces one patron on each bar.

Figure 9:
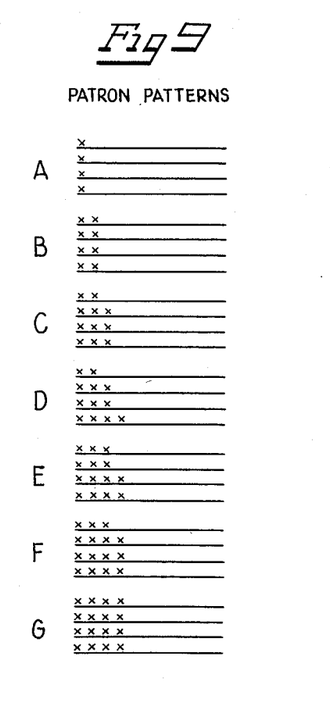
FIG. 9 is a schematic showing of various patron patterns.

Although there could be twelve patron patterns by introducing one additional patron in each succeeding pattern, it has been found that the seven patterns shown in FIG. 9 provide sufficient variation and challenge. Once the player has the experience of the initial rack wherein one patron initially appears on each bar, the second rack, using pattern "B", introduces two patrons per bar and then in pattern "C" an additional patron is introduced in the bottom three bars. Pattern "D" introduces the twelfth patron on the bottommost bar 45 while pattern "E" adds two more patrons, one on the uppermost bar 48 and one on the second to the bottom bar 46. In pattern "F" the fifteenth patron is added to bar 47 and finally in pattern "G" the last of the patrons is added to bar 48 so that each bar has a full compliment of four thirsty patrons. As indicated in the Table of FIG. 8 all sixteen patrons are initially introduced in rack 9 and thereafter appear through rack twenty-six. In rack twenty seven the bar and patron patterns will repeat those in rack one.

FIG. 8 also indicates a speed or difficulty designation "1" through "9". The speed or difficulty level relates to how fast the thirsty patrons advance along the bar, how soon an additional thirsty patron will be introduced, how soon an ousted patron will reenter, how long a patron will take to consume a filled mug before returning the empty mug, and how fast a returned empty mug will move. The implementation of the increasing speed or difficulty is achieved in a conventional video game programming manner. Although the Table indicates that the first regular rack will be at speed "1", the game may be provided, as has been conventional in prior art games, with an operator adjustment so that the operator can regulate the game to start at, for example, speed "3". In the case of such operator adjustment, speed "3" will be maintained in the first through the sixth racks and the seventh rack would be at the speed or difficulty level "4". Accordingly, the ultimate difficulty level "9" would be reached by the twelfth rack rather than fourteenth rack. Once the top level is reached it is then maintained throughout the rest of the game even if the game reaches rack twenty seven and beyond. In other words, although rack twenty seven may display bar pattern "WESTERN A" and patron pattern "A", it will be at speed or difficulty level "9" rather than "1".

The bar patterns schematically shown in FIG. 9 provide further variety and challenge. Thus, even within a particular setting such as the western scenes the orientation of the bars change. In addition to providing aesthetic variation, the different orientations of the bars also makes play more difficult. This game requires hand-eye coordination and timing to serve thirsty patrons with filled mugs without throwing a filled mug out the door or permitting a returned empty to fall off the supply end of the bar and the player is distracted by the need to visually shift attention from one side to the other as play moves up or down from one bar to another.

Once the setting, bar pattern, patron pattern and speed for a particular rack is determined by conventional programming via the CPU 82, program memory 84 and read/write memory 86, play of the rack is activated with the proper bar pattern and initial patron pattern at 112. In the early racks where less than all of the patrons are initially introduced a timer is started at 114 to control the introduction of additional patrons at predetermined intervals in accordance with the speed or difficulty level. The thirsty patrons at the bars are advanced, again at a speed dictated by the difficulty level of the rack, at 116.

As the thirsty patrons advance along the bar they are monitored at 118 to determine if any reach the supply or keg end of the bar. If none of the thirsty patrons reach the supply end of the bar the play of the rack merely continues. However, should a thirsty patron reach the end of the bar, the player loses a turn at 120. A determination is then made by 122 if there are any turns or lives left. If not, the game is over as indicated by 124. When there are turns remaining, the rack is started over again at 110. Although not indicated on the flow chart, the game may conveniently be started with three turns or lives and additional turns awarded upon reaching certain point milestones. Thus, for example, a fourth life may be earned upon the player accumulating Fifteen Thousand points. Similar extensions of play as a reward for attaining high point levels have been used in prior art video games.

As soon as a rack starts at 110, the joystick control 28 is monitored at 128, 130, 132 and 134. The joystick 28 is biased to a center "off" position. If the joystick is moved up the host image is directed at 138 to move up to the next bar. Each movement of the joystick from the center "off" to the up "on" position will cause the host image to go up to the next bar including scrolling around from the uppermost bar 48 to the lowermost bar 45. When the joystick control is in the down "on" position as monitored at 130 the host image is moved at 140 to the next bar down and will continue to so move every time the joystick is moved between the center and the down "on" position. Upon the joystick control being moved to the left or right as determined at 132 or 134, the host image is moved to the left at 142 or to the right at 144 along the horizontal bar at which the host image is positioned.

The two tapper controls 29 and 30 are monitored at 148 to determine if either of the controls have been pulled to the down "on" position; if not, the monitoring continues at 148. However, if the tapper switch is "on", the host image is moved adjacent the keg 50 of the bar on which the host image is positioned regardless of the lateral position of the host image along that bar. As well as moving the host image to the keg at 150, the tapper control "on" is stored for a predetermined time interval. A detection is made at 152 if the tapper switch has been on during the previous time interval. If the tapper switch has not previously been "on" then the graphics of the mug filling are displayed at 154. When the tapper control has been "on" in a previous time interval the mug is shown full at 156 and a check made at 158 to determine if the tapper control is still "on". If the tapper is still "on" the full mug continues to be shown. However, when the tapper control is released, the full mug is served at 160 along the bar toward the door end of the bar.

Presence of a thirsty patron at the bar on which the full mug has been served is discerned at 162. In the absence of the thirsty patron the player loses a turn at 120 with the previously described consequences. When a thirsty patron coincides with a served full mug 58b, the patron is repelled a predetermined incremental distance at 164. The repelled patron is checked at 166 to see if the patron has been repelled to the boundary represented by the door image 52. Upon the patron being repelled out the door a further check is made to see if all of the patrons are out the door at 168. The rack ends when all the patrons have been ousted and the game then proceeds to the next rack at 170.

Players are awarded points whenever a patron is ousted. When it is determined at 172 that the rack in play is a western rack the player gets Fifty points at 174. If it is not a western rack then a check is made at 176 to determine if it is a sports rack in which case, the player gets Seventy Five points at 178. Should the player be in a punk rack as determined at 180 a Hundred points are awarded for each ousted patron at 182 and if not then it must be a space rack and the player is awarded One Hundred Fifty points at 184. In the event that there are still other thirsty patrons at any of the bars, there is a delay at 188 upon a patron being ousted. After the delay the previously ousted patron reenters as a thirsty patron at 190 and is then advanced at 116 with the other thirsty patrons.

When a patron has been repelled at 164 but it is determined at 166 that the patron has not been repelled out the door boundary 52, there is a delay and the patron is shown drinking the mug at 192. The empty mug is returned along the bar back toward the keg end at 194 after the delay. Should the empty mug reach the supply or keg end of the bar without being caught by the player controlled image as determined at 196, the player loses a turn at 120 with the previously described consequences. The determination at 196 monitors not only the position of the returned empty mug but also that of the host image 56 as moved at 138, 140, 142, 144 and 150. In the event that the host image does catch the mug the player is awarded One Hundred points at 198.

Upon the sated patron returning the empty mug at 194 a determination is made at 200 on a random basis whether or not to leave a tip 60. If a tip is to be left one tip is deducted at 202 from the number of tips loaded at 204 by starting the rack at 110. A determination is then made at 206 if there are tips available and, if so, a tip timer is started at 208. After starting the tip timer, a continuing check is made at 210 to see if the tip timer is still on. When the tip timer goes off the tip is removed at 212. As long as the tip timer remains on a tip is shown at 214. At 218 a determination, based on the position of the host image from the movements at 138, 140, 142 and 144 is made to see if the tip is picked up by the host image. If the tip is not picked up the tip will continue to be shown as long as the tip timer remains on. Once the tip is picked up, the player scores Fifteen Hundred points at 220 and a random number of the patrons are graphically turned around to watch a dancing chorus line at 222. As long as the patrons watch the dancing they are not thirsty. After a delay at 224 the patrons turn back around, become thirsty again, and along with other thirsty patrons are advanced at 116.

Figure 11:
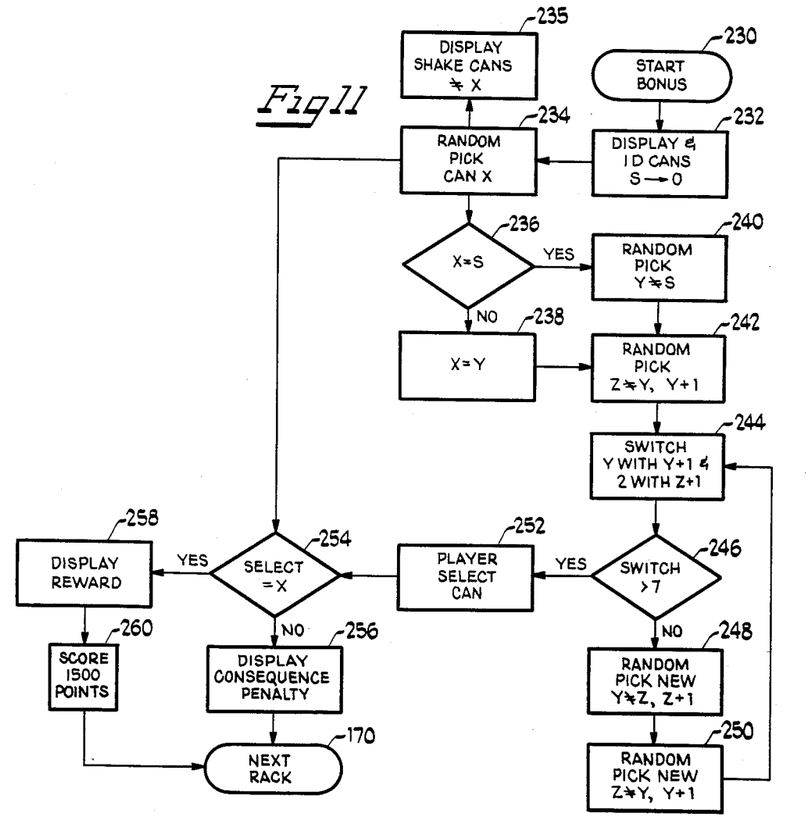
FIG. 11 is a flow chart for the bonus rack.

When the next rack is initiated at 170, the next bar pattern, patron pattern, and speed dictated by the Table of FIG. 8 is used in starting the rack at 110. In between the regular play racks, as indicated in the Table of FIG. 8, there are bonus racks, which have previously been described with respect to FIG. 5. In FIG. 11 there is a flow chart of the bonus rack which starts at 230.

Upon the start of the bonus rack six cans are displayed on a bar and numerically identified at 232. The can at the players left is identified as can number "5" and the remaining cans are identified in descending order to the right. One of the six cans is randomly picked as can "X" at 234. Can "X" is then displayed as the only can not being shaken by the character image 64 at 235.

Figure 12:
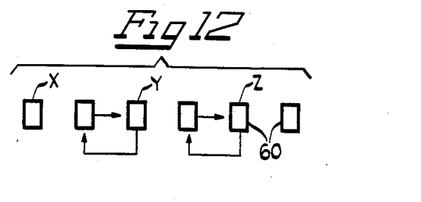
FIG. 12 is a schematic showing of a can switching sequence in the bonus rack.

A determination is made at 236 if the randomly picked can is the can at the end of the bar to the players left. If the left-most can has not been picked, then the selected can is designated at 238 to be part of the initial switching sequence. In the event that the left-most can has been picked then a second can "Y", that is not the left-most can, is randomly picked for the switching sequence at 240. Yet another can "Z" not equal to either can "Y" or the can immediately to the player's left of can "Y" is randomly picked at 242. A switching sequence, as shown in FIG. 12, is then initiated at 244 whereby can "Y" is graphically moved down and over to the left to the next, "Y+1", can position and then up into that can position while the can immediately to the left of "Y" is moved over to the right into the previous position of can "Y". Can "Z" and the can immediately to the left of "Z" are similarly switched at the same time. After each switch a determination is made at 246 to check if there have been seven switches. If not, a new can "Y" that was not can "Z" or the can to the immediate left of can "Z" is randomly picked at 248 and a new can "Z" that was not the previous can "Y" or the can to the immediate left of can "Y" is randomly picked at 250 and the switch sequence of 244 is again activated.

Once there have been seven switch sequences as determined at 246, the player is given a time interval in which to select a can at 252. Should the player fail to select the one unshaken can "X" as determined at 254 the consequence of a shaken can spraying the host is then displayed by 256 ending the bonus rack and the game then proceeds to the next rack at 170. However, if the player selects the unshaken can as determined at 254 a reward is then displayed at 258, which may include audio as well as video, and the player scores a bonus of Fifteen Hundred points at 260. The game then proceeds to the next rack at 170.

While a particular embodiment of the invention has been shown and described it will be apparent to those skilled in the art that further changes and modifications may be made without departing from the invention. It is intended in the appended claims to cover all such changes and modifications that fall within the true spirit and scope of the invention.

What is claimed as new and desired to be secured by Letters Patent is:

1. A game involving the repelling of ravenous images comprising:
   means for displaying a plurality of various ravenous images;
   means for displaying a host image;
   means for displaying a supply image;
   means for displaying a boundary image remote from the supply image;
   means for advancing the ravenous images from the boundary image to the supply image;
   player operable means for moving the host image and actuating the supply image upon initial operation of the player operable means and producing an image of a filled vessel;
   means detecting subsequent operation of the player operable means after the producing of an image of a filled vessel and propelling the filled vessel image toward the boundary image remote from the supply image;
   means discerning coincidence between the propelled filled vessel and an advancing ravenous image;
   means repelling the advancing ravenous image back toward the boundary image upon the coincidence with the filled vessel being discerned;
   a plurality of generally parallel sets of supply and boundary images with at least one ravenous image at each set;
   player controllable means for moving the host image from one of the sets to another set; and
   the means moving the host image from one set to another set also moving the host image between the supply image and the boundary image of each set and automatically shifting the host image into proximity with the supply image of the other set notwithstanding the position of the host image between the supply and boundary image of the one set.

2. The game of claim 1 in which the supply and boundary images of one set are reversed from the supply and boundary images of an adjacent set.

3. A game involving the repelling of ravenous images comprising:
   means for displaying a plurality of various ravenous images;
   means for displaying a host image;
   means for displaying a supply image;
   means for displaying a boundary image remote from the supply image;
   means for advancing the ravenous images from the boundary image to the supply image;
   player operable means for moving the host image and actuating the supply image upon initial operation of the player operable means and producing an image of a filled vessel;
   means detecting subsequent operation of the player operable means after the producing of an image of a filled vessel and propelling the filled vessel image toward the boundary image remote from the supply image;
   means discerning coincidence between the propelled filled vessel and an advancing ravenous image;
   means repelling the advancing ravenous image back toward the boundary image upon the coincidence with the filled vessel being discerned;
   the ravenous image being repelled an increment of the distance between the boundary image and the supply image; and
   means displaying the ravenous image emptying the filled vessel and then returning an empty vessel toward the supply image if the ravenous image has not been repelled beyond the boundary image.

4. The game of claim 3 including means terminating a player turn if the host image is not moved to intercept the returned empty vessel.

5. The game of claim 3 including means immobilizing the advance of the ravenous image during display of the ravenous image emptying the vessel.

6. The game of claim 3 including means terminating a player turn if there is no advancing ravenous image to receive the propelled filled vessel.

7. A game involving the repelling of ravenous images comprising:
   means for displaying a plurality of various ravenous images;
   means for displaying a host image;
   means for displaying a supply image;
   means for displaying a boundary image remote from the supply image;
   means for advancing the ravenous images from the boundary image to the supply image;
   player operable means for moving the host image and actuating the supply image upon initial operation of the player operable means and producing an image of a filled vessel;
   means detecting subsequent operation of the player operable means after the producing of an image of a filled vessel and propelling the filled vessel image toward the boundary image remote from the supply image;
   means discerning coincidence between the propelled filled vessel and an advancing ravenous image;
   means repelling the advancing ravenous image back toward the boundary image upon the coincidence with the filled vessel being discerned;
   means generating the appearance at prepatterned intervals of a collectable image between the boundary image and the supply image;
   player controllable means for moving the host image to collect the collectable image; and
   means delaying preselected ones of the ravenous images for a predetermined time interval upon the host image collecting the collectable image.

8. The game of claim 7 including means generating a distinguishing image of the preselected ones of the ravenous images during the predetermined time delay interval.

9. A method of generating a video game display and controlling the play of a game on a video display in response to player operation comprising:
   generating video display data transformable by the display into a video display including a playing field image, a player controllable host image, a plurality of ravenous images, a boundary image proximate one side of the playing field, a supply image proximate an opposed side of the playing field, and vessel images;
   adjusting the video display data in response to player operation to position the host image;
   generating a vessel filling image upon determining initial player operation to fill and propel a vessel;
   producing an image of the filled vessel being propelled toward an advancing ravenous image upon detecting subsequent player operation to propel a filled vessel;
   discerning coincidence of a propelled filled vessel and a ravenous image; and
   repelling the ravenous image toward the boundary image upon discerning such coincidence.

10. The method of claim 9 including the step of terminating a player turn if there is no advancing ravenous image to coincide with the propelled filled vessel.

11. The method of claim 9 including the steps of:
    generating a plurality of generally parallel disposed sets of opposed boundary images and supply images; and
    adjusting the video display data in response to player controls to move the host image from one of the sets to another set.

12. The method of claim 9 including the step of:
    repelling the ravenous image an incremental distance toward the boundary image upon discerning the coincidence;
    deciding if repelling the attacking image the incremental distance has moved the ravenous image beyond the boundary image.

13. The method of claim 12 including the step of having an ousted ravenous image that has been repelled beyond the boundary image reenter after a predetermined time delay.

14. The method of claim 12 including the steps of:
    delaying further advancement of the ravenous image if the ravenous image has not been repelled beyond by the boundary image exit; and
    generating an image of the ravenous image emptying the vessel and returning the empty vessel toward the supply image.

15. The method of claim 14 including the steps of terminating a player turn if the host image is not moved by the player controls to intercept the returning empty vessel prior to discerning the vessel being within a predetermined proximity to the supply image.

16. A video game involving player selection of one of a plurality of images comprising:
    means for producing a generally linear array of at least three similar images with each of the images in a respective fixed position;
    means momentarily distinguishing one of the images from the others of the array only during a preselected time interval;
    means displaying exchanging movement of the images of the array from one position to another position after the preselected time interval;
    means generating a switching sequence whereby a randomly picked image is moved from an initial position in the linear array in one direction generally transverse to the linear array and over in a first direction generally parallel to the linear array to a position spaced from but aligned with a position in the linear array adjacent to the initial position and then in a direction opposite to the one generally transverse direction into an adjacent position while the image in said adjacent position at the start of the sequence is moved along the array in a direction opposed to said first direction into the initial position occupied by said picked image at the start of the sequence;
    means for repeating the sequence one more time than the number of images in said array;
    means for picking an image at the beginning of each repeat sequence that was not the said picked image in the immediately previous sequence;
    player controllable means for selecting one of the images of the array after the exchanging movement;

means for producing a reward display upon selection of the one distinguished image of the array; and means producing a consequence image upon selection of any of the other images of the array.

17. The video game of claim 16 in which:

the images are of a container; and the means momentarily distinguishing the one image depicts all but the one image as being shaken.

18. The video game of claim 16 including means determining if the randomly picked image is the image at the end of the array in said first direction and if so, then picking another image.

19. The video game of claim 16 in which there are four or more images and the switching sequence includes two pairs of adjacent images.

* * * * *